B. P. GRAY.
MEANS FOR ROUGHING HORSES AND MULES.
APPLICATION FILED DEC. 5, 1918.

1,304,873.

Patented May 27, 1919.
2 SHEETS—SHEET 1.

INVENTOR:
Bertram Parrott Gray
By Wm Wallace White
ATT'Y.

B. P. GRAY.
MEANS FOR ROUGHING HORSES AND MULES.
APPLICATION FILED DEC. 5, 1918.
1,304,873.
Patented May 27, 1919.
2 SHEETS—SHEET 2.
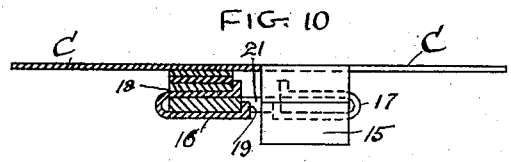
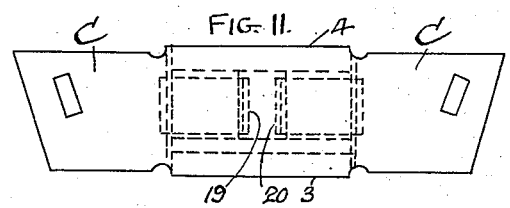
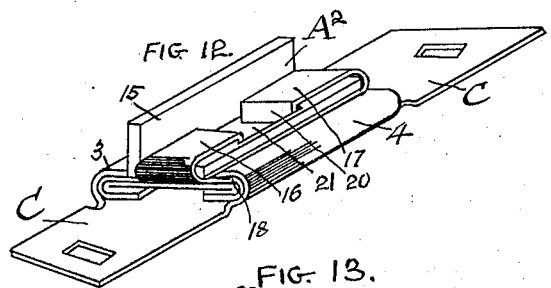
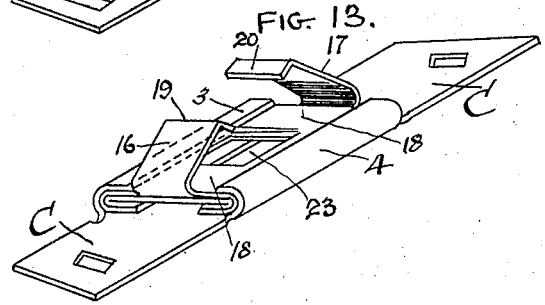
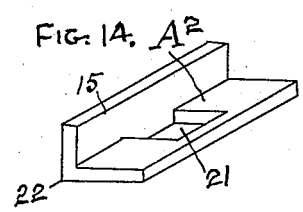
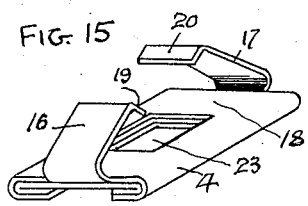
INVENTOR:
Bertram Parrott Gray
by Wm Wallace White
ATT'Y.

UNITED STATES PATENT OFFICE.

BERTRAM PARROTT GRAY, OF SUTTON COLDFIELD, ENGLAND.

MEANS FOR ROUGHING HORSES AND MULES.

1,304,873.  Specification of Letters Patent.  Patented May 27, 1919.

Application filed December 5, 1918. Serial No. 265,353.

*To all whom it may concern:*

Be it known that I, BERTRAM PARROTT GRAY, a subject of His Majesty the King of Great Britain and Ireland, residing at Ellangowan, Bishops Road, Sutton Coldfield, in the county of Warwick, England, have invented new and useful Improvements in Means for Roughing Horses and Mules, of which the following is a specification.

This invention has reference to improved means for roughing horses and mules. At the present time for this purpose it is customary to employ roughing cogs which are either made with screwed shanks and screwed into tapped holes in the rear ends of the shoe, or are made with taper shanks and driven into taper holes in the shoe. Roughing horses or mules in this way has the disadvantage that the whole of the pressure is taken on the marginal portion of the hoof instead of being partly borne by the frog, which latter is proved to be most beneficial for the foot. The object of my invention is to so rough a horse or mule that the pressure of the roughing cogs or blunts at the rear of the shoe will be taken on the frog. By this arrangement, as the frog is slightly resilient, the blunts or cogs will last longer in wear than when fixed in the usual way to the shoe which bears against the comparatively rigid hoof, and moreover when my said invention is employed the jar on the foot is minimized to some extent by the pressure being taken on the frog.

According to my invention, a roughing cog or blunt is, or roughing cogs or blunts are, removably attached to, or formed in a piece with, a bar or plate which I call a roughing bar which is attached to or formed with a cross-bar fitting on the top of the back portion of the shoe under the frog, said roughing bar being situated between the sides of the shoe under the frog against the underside of which the said roughing bar or plate or its carrying means bears so that the pressure of the frog thus comes directly on to this roughing bar or plate or its carrying means and through the cog or blunt, or cogs or blunts, on to the ground.

When a horse or mule is roughed according to this invention the possibility of the cogs treading or cutting another horse or mule is reduced to a minimum because the roughing cog or cogs or blunt or blunts is or are fixed farther in from the margin of the shoe than when they are fixed directly on the back ends of the shoe as is usual.

My invention can be carried into practice in various ways some of which by way of examples I will now describe by referring to the accompanying drawings of which Figure 1 is a plan looking on the top of a horseshoe with my invention applied thereto;

Fig. 10 is a part sectional back elevation of another arrangement of roughing bar attached to a cross-bar;

Fig. 11 is a plan of the same;

Fig. 12 is an inverted perspective view of the combined roughing bar and cross-bar shown in Figs. 10 and 11;

Fig. 13 is a perspective view of the cross-bar shown in Figs. 10, 11, 12 and its attachment means open ready for the attachment of the roughing bar, which is shown separately in an inverted position in Fig. 14; and Fig. 15 shows the attachment part separate from the cross-bar.

Figure 1:
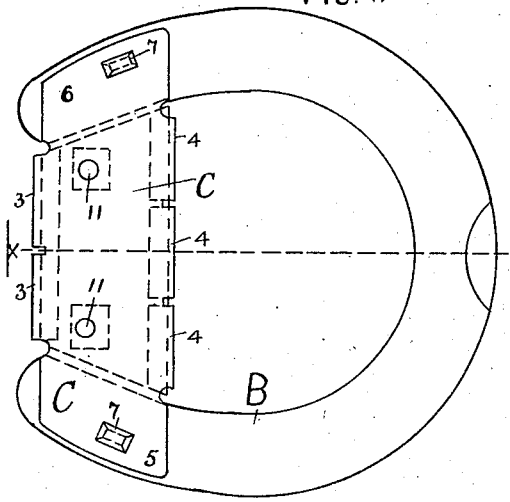
Figure 2:
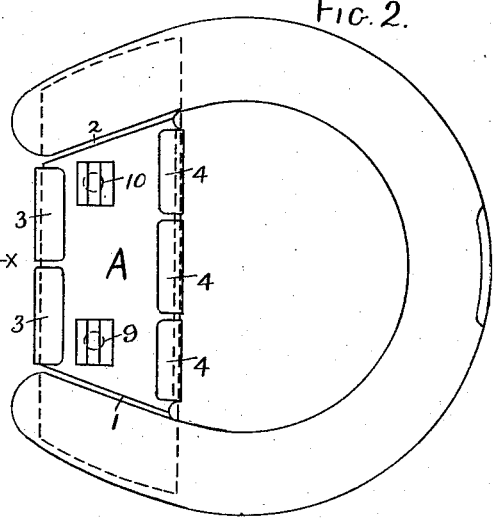
Fig. 2 is an inverted plan of the same.
Figure 3:
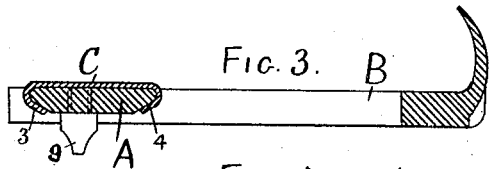
Fig. 3 is a sectional side elevation of the same taken on line X—X of Fig. 1.
Figure 4:
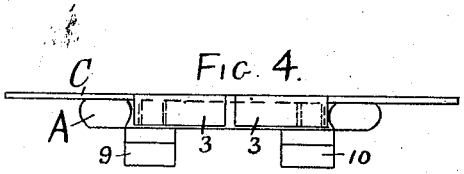
Fig. 4 is a back elevation.

In one arrangement of my invention illustrated by Figs. 1, 2, 3, 4, 5, and 6 the roughing bar A is a short flat section bar shaped at its ends 1, 2, to fit in the space between the two sides of the shoe B at the rear; and this roughing bar A is further secured by fitting in an inverted trough-shaped cross-bar C made of slightly dovetailed shape in cross-section (see Fig. 3) and is made with inturned flanges 3, 4, between which the roughing bar A fits, said roughing bar being made of the proper dovetailed or beveled edge shape in cross-section to fit between the inturned flanges 3, 4, of the cross-bar. These flanges 3, 4, of the cross-bar only extend between the sides of the shoe B, the end portions of the cross-bar C which fit on the top of the shoe B being flat and there secured by any convenient means, such as by a rivet or the head end of a horse shoe nail 7 passing through holes 8 in the cross-bar into corresponding holes in the shoe. The roughing bar A carries on its underside the roughing cogs or blunts. In the example illustrated these are two in number, marked respectively 9 and 10, and they are secured to the roughing bar A by their screwed shanks being screwed into tapped holes 11 therein, or said cogs or blunts may be secured to the roughing bar in any other suitable manner.

In using this arrangement of my invention the roughing bar A made with the tapped or tapered holes 11 for the shanks of the roughing cogs or blunts to fit in, is passed endwise into the groove of the cross-bar C before the latter is fixed on the top of the shoe B as by the nail heads 7, and the shoe B carrying the cross-bar C and roughing bar A is nailed to the hoof in the usual way. Thus when the horse or mule is required to be roughed it is only necessary to attach the cogs or blunts, such as 9, 10, by screwing or driving them into the holes 11 in the roughing bar A and then when the cogs or blunts are not required they can readily be removed from the roughing bar A, which remains ready for the attachment of the cogs or blunts when required.

Figures 7, 8:
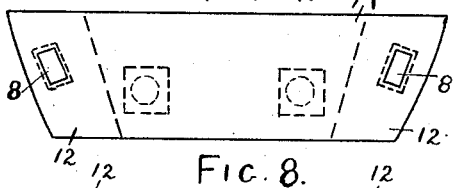
Fig. 7 is a plan and Fig. 8 is a back elevation of a modified form of roughing bar and roughing cogs.
Figures 5, 6:
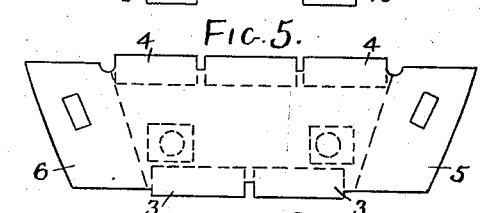
Fig. 5 is a plan of the roughing bar with its cross-bar or holder and roughing cogs detached from the shoe.
Fig. 6 is a plan and back elevation of the roughing bar part separately of the device illustrated in Figs. 4 and 5.

As a modification the roughing bar may, as shown in Figs. 7 and 8, be made so that no separate cross-bar is required, the roughing bar, in this case marked A¹, being made with comparatively thin end portions 12 to fit on to the top of the shoe B and to be there secured by nail heads passing through the holes 8 in the parts 12 into the shoe, or other suitable means being employed for securing the parts 12 on to the shoe.

Figure 9:
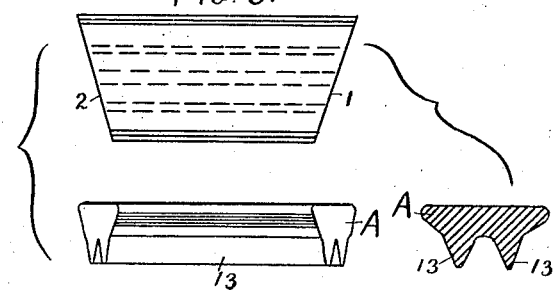
Fig. 9 is a plan, back elevation and cross-section of a further modified form of roughing bar for use with the cross-bar or holder part illustrated in Figs. 4 and 5.

Moreover as a further modification the roughing bar A made with its ends 1, 2, to fit between the sides of the back of the shoe and with the back and front edges beveled or inclined to fit within the portions 3, 4, of the cross-bar C, may as in Fig. 9 be made with V-shaped or other cross ribs 13 or other projections on its under side to serve as roughing cogs, so that in this case the roughing bar and its cogs are formed together in one piece.

The roughing bar A may be made in one piece or may be divided crosswise into two or more pieces; for instance, the roughing bar (see Fig. 6) can be divided crosswise centrally on the dotted line 14 so that when these two parts are fixed in position on the under side of the cross-bar C the division will allow a certain amount of bending of the roughing bar with its cross-bar C.

The inverted trough section cross-bar C can conveniently be made of mild sheet steel and of such a thickness as to be slightly resilient and so that the downwardly projecting flanges 4 between which the roughing bar fits can if desired by means of a hammer and chisel or other suitable tool be bent backwardly sufficiently to allow of the roughing bar A being removed and renewed without removing the shoe from the hoof, and then when a new roughing bar has been inserted in the cross-bar the flanges 4 can be hammered or otherwise forced back against the inclined side of the roughing bar A so as to properly secure the same to the cross-bar. By the ends 1, 2 of the roughing bar being cut off at the proper angle to fit properly between the sides of the shoe B, which gradually widens from the back end toward the center, the roughing bar A is prevented from working out at the back of the shoe.

In another modification of my invention (see Figs. 10 to 15) the roughing bar A² is made of angle section with a downwardly projecting flange 15 along its back edge adapted to form the blunt to come in contact with the ground. The means for removably attaching this roughing bar A² to the cross-bar C consist of two lateral clip-like tongues 16, 17, formed with a plate 18 which is fixed to the under side of the cross-bar C by the inturned flanges 3, 4, of the cross-bar being closed over this plate 18 so that the tongues 16, 17 are situated between these flanges 3, 4. The extreme end portions 19, 20, of the tongues 16, 17, are turned inwardly at right angles to the tongues 16, 17, and engage in a central hole 21 of the roughing bar A² when the latter is placed in position under the tongues 16, 17, and the latter are closed on the plate A², as in Figs. 10, 11, and 12. The back edge 22 of the roughing bar A² engages against the edge of the inturned flange 3 and is thus further prevented from moving backwardly off the cross-bar C. The plate 18 is made with a central hole 23 to accommodate the inturned ends 19, 20, of the tongues 16, 17. The roughing bar A² can when worn be readily removed and be replaced by a new one by first turning up the clips 16, 17, by means of a screwdriver or chisel or other flat instrument being inserted between the clip and the roughing bar A² and used as a lever.

What I claim as my invention and desire to secure by Letters Patent is:—

1. A roughing device for a horseshoe comprising a cross-bar adapted to span the ends of a shoe, a roughing bar, and tongues carried by the cross-bar and bendable to secure the roughing bar to the cross-bar.

2. A roughing device for a horseshoe comprising a cross-bar adapted to span the ends of a shoe, inturned bendable flanges formed on the cross-bar, a plate secured to the cross-bar by said flanges, bendable tongues carried by said plate, and a roughing bar secured on said plate by said tongues.

3. A roughing device for a horseshoe comprising a cross-bar adapted to span the ends of a shoe, a plate secured to the cross-bar and formed with an opening, an angular roughing bar disposed on said plate and having an opening formed therein, and tongues carried by said plate and bendable to secure the roughing bar on the plate in such manner that portions of the tongues will be disposed in said openings.

4. A roughing device for a horseshoe comprising a cross-bar adapted to span the ends of a shoe, a roughing bar, and bendable means for detachably securing the roughing bar on the cross-bar.

In testimony whereof I have signed my name to this specification.

BERTRAM PARROTT GRAY.

Copies of this patent may be obtained for five cents each, by addressing the "Commissioner of Patents, Washington, D. C."